US012455351B2

(12) United States Patent
Kim et al.

(10) Patent No.: US 12,455,351 B2
(45) Date of Patent: Oct. 28, 2025

(54) METHOD FOR GENERATING DYNAMIC MAP USING LIDAR SENSOR AND DETERMINING OBJECT USING GENERATED DYNAMIC MAP, AND APPARATUS PERFORMING THE METHOD

(71) Applicant: Vueron Technology Co., Ltd, Seoul (KR)

(72) Inventors: Jaekwang Kim, Bucheon-si (KR); Seungyong Lee, Goyang-si (KR)

(73) Assignee: Vueron Technology Co., Ltd, Seoul (KR)

( * ) Notice: Subject to any disclaimer, the term of this patent is extended or adjusted under 35 U.S.C. 154(b) by 1094 days.

(21) Appl. No.: 17/462,336

(22) Filed: Aug. 31, 2021

(65) Prior Publication Data

US 2023/0060270 A1    Mar. 2, 2023

(30) Foreign Application Priority Data

Aug. 27, 2021  (KR) .................. 10-2021-0114234

(51) Int. Cl.
*G01S 7/41* (2006.01)
*G01S 7/48* (2006.01)
(Continued)

(52) U.S. Cl.
CPC .............. *G01S 7/412* (2013.01); *G01S 7/417* (2013.01); *G01S 7/4808* (2013.01); *G01S 17/89* (2013.01); *G06T 7/50* (2017.01); *G06V 20/58* (2022.01)

(58) Field of Classification Search
CPC ........... G01S 7/412; G01S 7/417; G01S 17/89
(Continued)

(56) References Cited

U.S. PATENT DOCUMENTS 11,645,861 B2 *  5/2023  Heift ................... G06V 40/103
                                                         382/103
2015/0105964 A1 *  4/2015  Sofman ............... G05D 1/0274
                                                         701/461
(Continued)

FOREIGN PATENT DOCUMENTS

KR   1020170008505 A    1/2017
KR   1020190043035 A    4/2019
(Continued)

OTHER PUBLICATIONS

12. "Hornung et al., OctoMap: An Efficient Probabilistic 3D Mapping Framework Based on Octrees, Autonomous Robots (2013)" (Year: 2013).*

(Continued)

*Primary Examiner* — Robert W Hodge
*Assistant Examiner* — Kara M. Richter
(74) *Attorney, Agent, or Firm* — Bridgeway IP Law Group, PLLC; Jihun Kim

(57) ABSTRACT

A method for generating a dynamic map, which is performed by a dynamic map generation apparatus, is provided. The method includes arranging point data acquired from a lidar sensor in a plurality of cells included in a voxel, calculating a point occupation frequency change of each of the plurality of cells according to an attribute and a status of each of the plurality of cells, and generating the dynamic map by using, among the plurality of cells, background cells in each of which a value accumulating the point occupation frequency change is equal to or greater than a predetermined threshold.

20 Claims, 10 Drawing Sheets

(51) Int. Cl.
*G01S 17/89* (2020.01)
*G06T 7/50* (2017.01)
*G06V 20/58* (2022.01)

(58) Field of Classification Search
USPC .............................................................. 356/4
See application file for complete search history.

(56) References Cited

U.S. PATENT DOCUMENTS

| | | | | |
|---|---|---|---|---|
| 2018/0113200 | A1* | 4/2018 | Steinberg | G08G 1/166 |
| 2019/0156684 | A1* | 5/2019 | Pohl | G08G 5/55 |
| 2021/0056712 | A1* | 2/2021 | Daudelin | G06V 20/58 |
| 2022/0358665 | A1* | 11/2022 | Chang | G01S 17/50 |
| 2022/0383585 | A1* | 12/2022 | Lee | G06T 15/08 |

FOREIGN PATENT DOCUMENTS

| | | | | |
|---|---|---|---|---|
| KR | 20210065837 A | * | 6/2021 | G09B 29/003 |
| WO | WO-2020187191 A1 | * | 9/2020 | H04N 19/176 |

OTHER PUBLICATIONS

Xiangzhi Bai, et al.; "Survey on Dim Small Target Detection in Clutter Background: Wavelet, Inter-frame and Filter Based Algorithms"; Procedia Engineering, Advanced in Control Engineering and Information Science; 2011; 5 pages.

Til Aach, et al.; "Statistical Model-Based Change Detection in Moving Video"; Institute of Imaging & Computer Vision, Signal Processing; 1993; 17 pages.

Huang et al., "Point Cloud Labeling using 3D Convolutional Neural Network". 2016 23rd International Conference on Pattern Recognition (ICPR); Dec. 4-8, 2016; 6 pages.

* cited by examiner

METHOD FOR GENERATING DYNAMIC MAP USING LIDAR SENSOR AND DETERMINING OBJECT USING GENERATED DYNAMIC MAP, AND APPARATUS PERFORMING THE METHOD

CROSS-REFERENCE TO RELATED APPLICATION

This application claims priority to Korean Patent Application No. 10-2021-0114234, filed on Aug. 27, 2021. The entire contents of the application on which the priority is based are incorporated herein by reference.

TECHNICAL FIELD

The present disclosure relates to a method for generating a dynamic map using a lidar sensor and determining an object using the generated dynamic map, and an apparatus performing the method.

BACKGROUND

<Industry in which a Lidar Sensor is Used by Installing The Lidar Sensor at Infrastructure>

Recently, since the utilization of the lidar sensor has been increased, applying the lidar sensor to various industry environment is being considered.

The market of the lidar sensor is being grown according to the growth of the autonomous driving industry. Accordingly, the lidar sensor that received attention for an essential sensor in the autonomous driving is also being recognized for its value in various industries based on merits such as high accuracy and insensitivity for a change of illuminance.

Depending upon the applied field of the lidar sensor, the lidar sensor may be applied to a field that the lidar sensor is installed at a moving object and a field that the lidar sensor is installed at infrastructure.

In the field of installing the lidar sensor at the moving object, the lidar sensor has functions of detecting obstacles around the moving objects such as autonomous vehicles, robots, unmanned ships, and so on and generating routes for the moving objects to perform autonomous driving.

Meanwhile, in the field of installing the lidar sensor at infrastructure, the lidar sensor has functions of detecting trespasser in certain areas, detecting moving objects, or measuring sizes of particular spaces and moving objects with being fixed at a predetermined position.

<Problems of the Conventional Map Generation and Security System Using the Lidar Sensor>

Conventionally, various techniques have been studied for generating a map using the lidar sensor. However, since most of the conventional techniques are vulnerable to process numerous points, they have drawbacks of taking long time for generating the map or of being difficult to update the map in real time.

Further, the conventional security system using the lidar sensor mainly focuses on detecting human beings. In this connection, the system generally detects learned attributes of human beings using a deep-learning technique. However, there are difficulties to detect objects in various shapes with only this technique.

SUMMARY

In view of the above, the present disclosure provides a method for generating a dynamic map using a lidar sensor and determining an object using the generated dynamic map, and an apparatus performing the method.

Technical objects to be achieved by the present disclosure are not limited to those described above, and other technical objects not mentioned above may also be clearly understood from the descriptions given below by those skilled in the art to which the present disclosure belongs.

In accordance with an aspect of the present disclosure, there is provided a method for generating a dynamic map, which is performed by a dynamic map generation apparatus, the method including: arranging point data acquired from a lidar sensor in a plurality of cells included in a voxel; calculating a point occupation frequency change of each of the plurality of cells according to an attribute and a status of each of the plurality of cells; and generating the dynamic map by using, among the plurality of cells, background cells in each of which a value accumulating the point occupation frequency change is equal to or greater than a predetermined threshold.

Further, the attribute of each of the plurality of cells may include a normal cell and a supporting cell of which a possibility of being the background cell is higher than the normal cell. Further, the calculating of the point occupation frequency change of each of the plurality of cells may include determining, among the plurality of cells, an attribute of a cell satisfying at least one of preset conditions as the supporting cell.

Further, the preset conditions may include whether all of cells adjacent to each of the plurality of cells are determined as the background cells, and whether each of the plurality of cells is an occupation cell and other cells having a same rho component value and a same theta component value as each of the plurality of cells are non-occupation cells.

Further, the supporting cell may have a degree of the point occupation frequency change that is greater than that of the normal cell.

Further, the status of each of the plurality of cells may include a blocked cell that does not have the point occupation frequency change and an unblocked cell that has the point occupation frequency change. The calculating of the point occupation frequency change of each of the plurality of cells may include, when there exists an occupation cell, determining a cell having the same theta component value and the same phi component value with the occupation cell and having a rho component value greater than a rho component value of the occupation cell as the blocked cell, among the plurality of cells.

Further, the method described above may further include clustering foreground cells corresponding to a moving object among the plurality of cells into one or more clusters; determining, by using a pre-trained object determination neural network, whether each of one or more foreground objects, respectively corresponding to the one or more clusters, corresponds to a detecting target object of the dynamic map generation apparatus; and displaying the foreground object corresponding to the detecting target object among the one or more foreground objects on the dynamic map.

Further, the object determination neural network may be trained in advance to output a classification result of a foreground object for training when the object determination neural network receives feature values of the foreground object for training and a labeled object that is label data of the feature values of the foreground object for training.

In accordance with another aspect of the present disclosure, there is provided a dynamic map generation apparatus including: a transceiver configured to acquire point data by detecting a vicinity of a lidar sensor; and a processor configured to control the transceiver. Further, the processor is configured to: arrange the point data in a plurality of cells included in a voxel; calculate a point occupation frequency change of each of the plurality of cells according to an attribute and a status of each of the plurality of cells; and generate the dynamic map by using, among the plurality of cells, background cells in each of which a value accumulating the point occupation frequency change is equal to or greater than a predetermined threshold.

In accordance with still another aspect of the present disclosure, there is provided a dynamic map generation system including: a lidar sensor configured to acquire point data by detecting a vicinity of the lidar sensor; and a dynamic map generation apparatus configured to generate a dynamic map. The dynamic map generation apparatus includes a transceiver configured to acquire the point data from the lidar sensor; and a processor configured to control the transceiver. Further, the processor is configured to: arrange the point data in a plurality of cells included in a voxel; calculate a point occupation frequency change of each of the plurality of cells according to an attribute and a status of each of the plurality of cells; and generate the dynamic map by using, among the plurality of cells, background cells in each of which a value accumulating the point occupation frequency change is equal to or greater than a predetermined threshold.

In accordance with still another aspect of the present disclosure, there is provided a non-transitory computer-readable storage medium storing computer-executable instructions which cause, when executed by a processor, the processor to perform a method for generating a dynamic map, which is performed by a dynamic map generation apparatus, the method including: arranging point data acquired from a lidar sensor in a plurality of cells included in a voxel; calculating a point occupation frequency change of each of the plurality of cells according to an attribute and a status of each of the plurality of cells; and generating the dynamic map by using, among the plurality of cells, background cells in each of which a value accumulating the point occupation frequency change is equal to or greater than a predetermined threshold.

According to the aspects of the present disclosure, the dynamic map is generated by dividing the voxel into the plurality of cells, so that it is possible to efficiently and rapidly process the plurality of points acquired using the lidar sensor.

Further, according to the aspects of the present disclosure, the dynamic map is generated by dividing the voxel into the plurality of cells, so that it is possible to generate and update the dynamic map in real time.

DETAILED DESCRIPTION

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1:
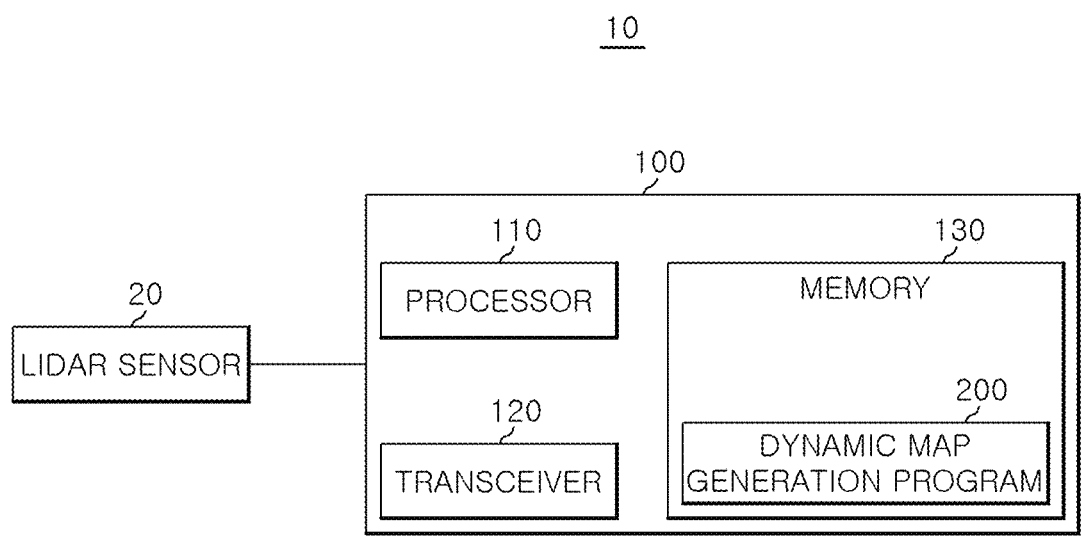
FIG. 1 is a block diagram illustrating a dynamic map generation system according to an embodiment of the present disclosure.

FIG. 1 is a block diagram illustrating a dynamic map generation system according to an embodiment of the present disclosure.

Referring to FIG. 1, the dynamic map generation system 10 may include a lidar sensor 20 and a dynamic map generation apparatus 100.

In the present disclosure, for the sake of convenience of description, a case where the dynamic map generation system 10 is installed in an autonomous vehicle (hereinafter simply referred to as a vehicle) is mainly described. However, the present disclosure is not limited thereto. For example, the dynamic map generation system 10 may be installed in an unmanned moving object such as a drone or other moving objects such as a vehicle, a motorcycle, a flight vehicle, and the like as well as the autonomous vehicle.

In addition, in the present disclosure, a case where the lidar sensor 20 is provided separately from the dynamic map generation apparatus 100 to transmit point data to the dynamic map generation apparatus 100 is mainly described. However, the present disclosure is not limited thereto. For example, the dynamic map generation apparatus 100 may include the lidar sensor 20. In this case, the lidar sensor 20 may transmit the point data to a voxel generation unit 210 which will be described later through internal signaling.

The lidar sensor 20 may emit a laser beam in a predetermined direction, for example, in all direction (360 degrees) including not only a direction in which the dynamic map generation apparatus 100 moves (forward direction) but also lateral and backward directions of the dynamic map generation apparatus 100. The lidar sensor 20 may receive a reflected (or backscattered) laser beam from surrounding terrain and the like. Here, the laser beam emitted and received by the lidar sensor 20 may include at least one point data.

The dynamic map generation apparatus 100 may receive point data from the lidar sensor 20, generate a dynamic map for a vicinity of the dynamic map generation apparatus 100 (or a vicinity of a vehicle having the dynamic map generation apparatus 100) using the received point data, and display a detected target object on the generated dynamic map.

More specifically, the dynamic map generation apparatus 100 may generate a voxel that is divided into a plurality of cells, arrange a plurality of points included in the received point data in each of the plurality of cells, determine whether each of the plurality of cells is a foreground cell or a background cell by calculating a point occupation frequency (the number of times the cell is determined as the occupation cell (how often the cell has one or more points)) for each of the plurality of cells, generate a dynamic map based on the determination result, detect a target object in surroundings by clustering foreground cells, and display the detected target object on the dynamic map.

In this connection, the dynamic map generation apparatus 100 may include a processor 110, a transceiver 120, and a memory 130.

The processor 110 may generally control an operation of the dynamic map generation apparatus 100.

The processor 110 may receive point data from the lidar sensor 20 using the transceiver 120.

In the present disclosure, a case where the dynamic map generation apparatus 100 receives the point data using the transceiver 120 is mainly described. However, the present disclosure is not limited thereto. For example, the dynamic map generation apparatus 100 may include an input/output device (not shown) and receive the point data through the input/output device. Alternatively, for example, the dynamic map generation apparatus 100 may include the lidar sensor 20 to generate the point data in the dynamic map generation apparatus 100.

The memory 130 may store information for a dynamic map generation program 200 and information required to execute the dynamic map generation program 200.

The dynamic map generation program 200 of the present disclosure may be software including commands programmed to generate a voxel divided into a plurality of cells, to arrange a plurality of points included in the received point data into each of the plurality of cells, to determine whether each of the plurality of cells is a foreground cell or a background cell by calculating a point occupation frequency (the number of times the cell is determined as the occupation cell) for each of the plurality of cells, to generate a dynamic map based on the determination, to detect a target object in surroundings by clustering foreground cells, and to display the detected target object on the dynamic map.

The processor 110 may load information of the dynamic map generation program 200 and information required to execute the dynamic map generation program 200, in order to execute the dynamic map generation program 200.

The processor 110 may execute the dynamic map generation program 200, generate a voxel divided into a plurality of cells, arrange a plurality of points included in the received point data into each of the plurality of cells, determine whether each of the plurality of cells is a foreground cell or a background cell by calculating a point occupation frequency for each of the plurality of cells, generate a dynamic map based on the determination, detect a target object in surroundings by clustering foreground cells, and display the detected target object on the dynamic map.

Figure 2:
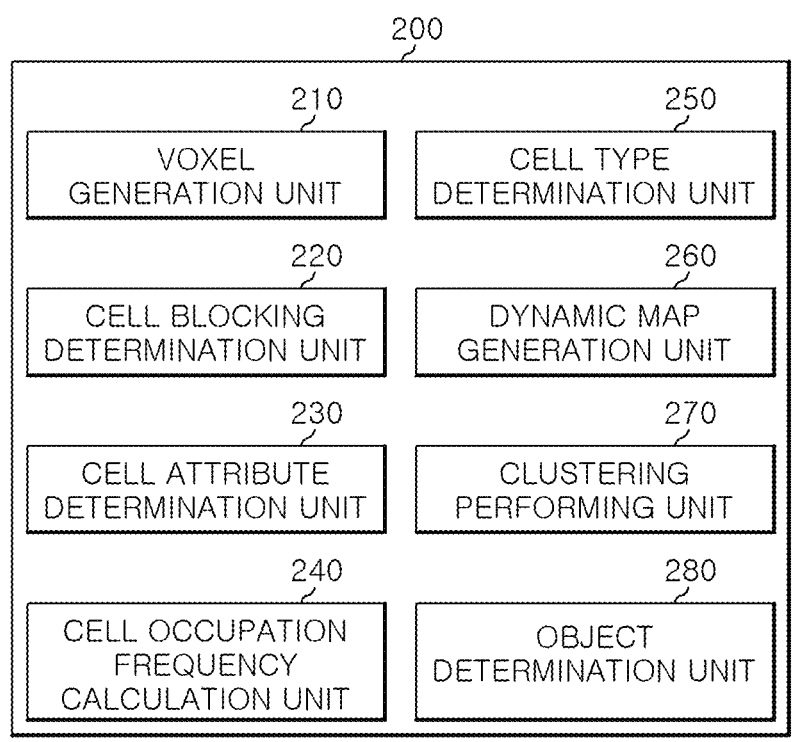
FIG. 2 is a block diagram conceptually illustrating functions of a dynamic map generation program according to the embodiment of the present disclosure.

The functions and/or operations of the dynamic map generation program 200 are to be explained in detail through FIG. 2.

FIG. 2 is a block diagram conceptually illustrating functions of the dynamic map generation program according to the embodiment of the present disclosure.

Referring to FIG. 1 and FIG. 2, the dynamic map generation program 200 may include a voxel generation unit 210, a cell blocking determination unit 220, a cell attribute determination unit 230, a cell occupation frequency calculation unit 240, a cell type determination unit 250, a dynamic map generation unit 260, a clustering performing unit 270, and an object determination unit 280.

The voxel generation unit 210, the cell blocking determination unit 220, the cell attribute determination unit 230, the cell occupation frequency calculation unit 240, the cell type determination unit 250, the dynamic map generation unit 260, the clustering performing unit 270, and the object determination unit 280 described in FIG. 2 are conceptually illustrated in order to easily explain the functions of the dynamic map generation program 200. However, the present disclosure is not limited thereto. For example, the functions of the voxel generation unit 210, the cell blocking determination unit 220, the cell attribute determination unit 230, the cell occupation frequency calculation unit 240, the cell type determination unit 250, the dynamic map generation unit 260, the clustering performing unit 270, and the object determination unit 280 may be merged/separated, and may be embodied with a series of commands included in one program.

The voxel generation unit 210 may generate a spherically shaped voxel around the lidar sensor that is the center of the voxel, divide the voxel into a plurality of cells, and arrange a plurality of points included in the received point data in each of the plurality of cells.

Figure 3:
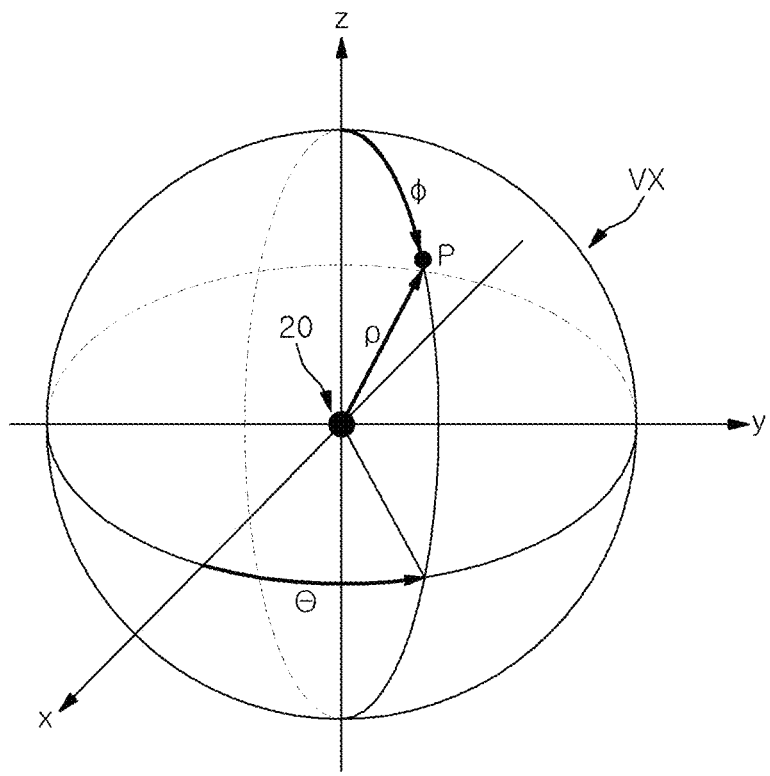
FIG. 3 illustrates a voxel with a rho component, a theta component, and a phi component thereof.

For example, referring to FIG. 3, the plurality of cells included in the voxel VX may have a rho component $\rho$, a theta component $\theta$, and a phi component $\varphi$.

The rho component $\rho$ may indicate a distance from the lidar sensor 20 to a cell, the theta component $\theta$ may indicate a degree from a predetermined first reference direction (e.g., x-axis of FIG. 3) to a left or right position with the lidar sensor 20 as the center, and the phi component $\varphi$ may indicate a degree from a predetermined second reference direction (e.g., z-axis of FIG. 3) to an upper or lower position with the lidar sensor 20 as the center.

Referring to FIG. 2, the cell blocking determination unit 220 may determine whether each of the plurality of cells is blocked or not, by using a rho component value of an occupation cell among cells having the same theta component value and the same phi component value. Here, "occupying a cell" or "an occupation cell" may indicate that at least one point is positioned in the corresponding cell. That is, in case that at least one point is positioned in a certain cell, it may be described that "the certain cell is occupied" or "the certain cell is an occupation cell."

More specifically, if there is an occupation cell among cells having the same theta component value and the same phi component value, the cell blocking determination unit 220 may determine cells having rho component values that are greater than the rho component value of the occupation cell as the blocked cells.

This is because that the theta component and the phi component indicate the direction where a cell is positioned based on the lidar sensor 20, and the rho component indicates the distance from the lidar sensor to the position where the cell is located. That is, if there is an occupation cell, since the laser emitted from the lidar sensor 20 is reflected by the occupation cell, the laser does not reach blocked cells of which the rho component values are greater than the rho component value of the occupation cell while the positional directions of the blocked cells are the same as the positional direction of the occupation cell, and thus, a blocked cell may not be detected by the lidar sensor 20 even if the blocked cell is the occupation cell.

In addition, in case that when a cell occupation frequency calculation unit 240 to be described later calculates the point occupation frequency (the number of times the cell is determined as the occupation cell) without considering the 'blocking of cells', the situation of 'blocking of cells' continues (i.e., the blocked cells continuously exist), the occupation of blocked cells, of which the theta component values and the phi component values are the same as those of the occupation cell and the rho component values are greater than the rho component value of the occupation cell, may not be determined continuously. In this case, it would be a problem that the blocked cells cannot be determined as background cells continuously.

Accordingly, if there is an occupation cell, the cell blocking determination unit 220 may determine a cell of which the theta component value and the phi component value are the same as those of the occupation cell and the rho component value is greater than the rho component value of the occupation cell as the blocked cell.

Figure 4:
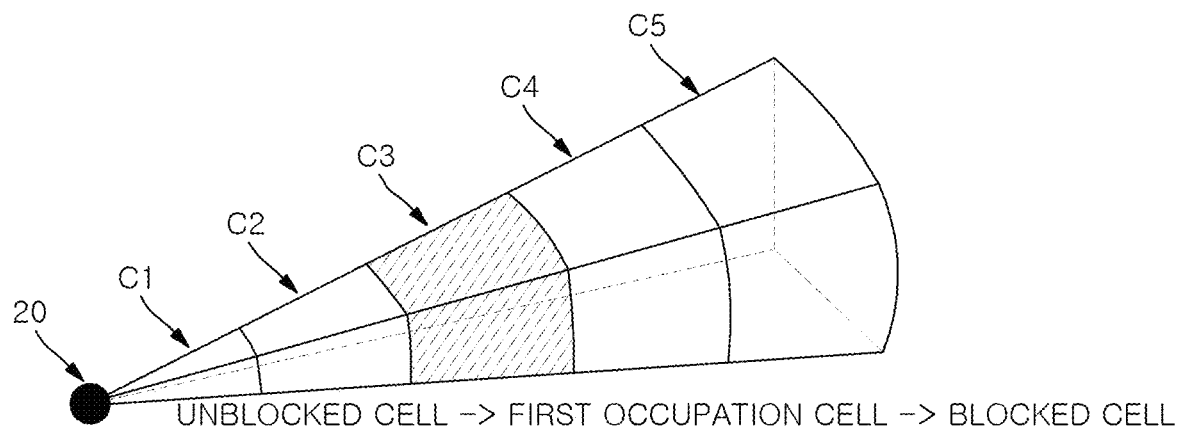
FIG. 4 illustrates an example of a method how a cell blocking determination unit determines a blocked cell according to the embodiment of the present disclosure.

For example, FIG. 4 illustrates an example of a method how the cell blocking determination unit 220 determines the blocked cell according to the embodiment of the present disclosure.

Referring to FIG. 4, since a first cell C1 to a fifth cell C5 have the same directions from the lidar sensor 20 with the lidar sensor 20 as the center, the theta component value and the phi component value are the same, and the rho component value is getting greater as it goes from the first cell C1 to the fifth cell C5 because a distance from the lidar sensor 20 is getting farther as it goes from the first cell C1 to the fifth cell C5.

Here, if the third cell C3 is the occupation cell, since the rho component values of the fourth cell C4 and the fifth cell C5 are greater than the rho component value of the third cell C3, the cell blocking determination unit 220 may determine that the fourth cell C4 and the fifth cell C5 are the blocked cells.

Figure 5A:
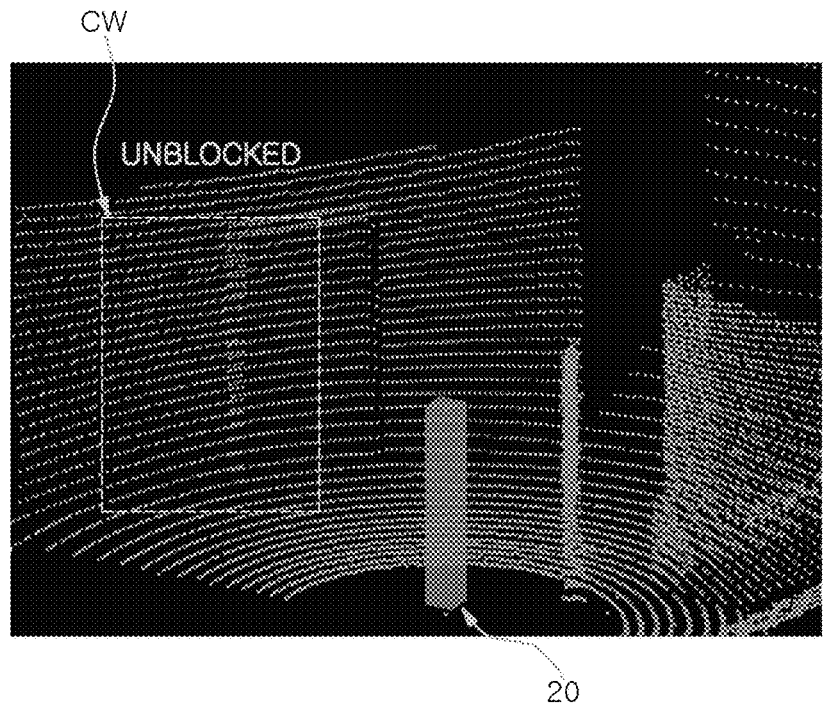
FIG. 5A is an example of the dynamic map according to the embodiment of the present disclosure.
Figure 5B:
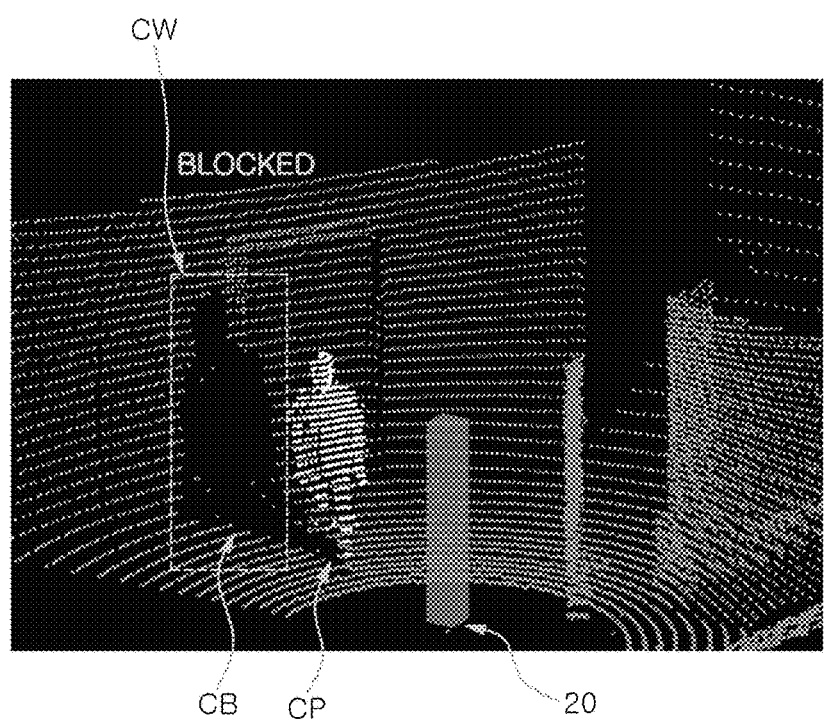
FIG. 5B is an example of the dynamic map according to the embodiment of the present disclosure.

Further, FIGS. 5A and 5B are examples of the dynamic map according to the embodiment of the present disclosure.

Referring to FIGS. 5A and 5B, in case of FIG. 5A, since there is no occupation cell between the lidar sensor 20 and cells corresponding to a wall CW, it can be confirmed that the cells corresponding to the wall CW are correctly recognized without being blocked.

However, in case of FIG. 5B, since there are cells corresponding to a person CP between the lidar sensor 20 and the cells corresponding to the wall CW, the cell blocking determination unit 220 may determine that cells CB having the same theta component value and the same phi component value with the cells corresponding to the person CP as the blocked cells.

Accordingly, among the cells corresponding to the wall CW, it can be confirmed that the cells CB having the same theta component value and the same phi component value with the cells corresponding to the person CP are remained not being recognized as the wall (not being determined whether they are occupied or not).

Meanwhile, the cell attribute determination unit 230 may divide a plurality of cells included in the voxel into normal cells and supporting cells.

Here, the supporting cells may indicate cells having high possibility that are determined to be background cells depending on peripheral information, and the normal cells may indicate cells that are not the supporting cells.

The cell attribute determination unit 230 may define cells satisfying at least one of below two conditions as the supporting cells among the plurality of cells included in the voxel.

(1) whether all of the cells adjacent to the cell are decided as the background cells
(2) whether the cell itself is the only occupation cell comparing with cells having the same rho component values and the same theta component values and having different phi component values The condition (1) is for preventing the background cells being misrecognized as the foreground cells due to a noise of the lidar sensor, and the condition (2) is for the reason that if the cell itself is the only occupation cell, there is a high possibility that the cell corresponds to the ground.

Then, the cell occupation frequency calculation unit 240 may calculate the point occupation frequency of each of the plurality of cells included in the voxel according to the attribute of each cell and the status of each cell (e.g., whether it is a blocked cell or whether it is an occupation cell or not).

More specifically, the cell occupation frequency calculation unit 240 may calculate the point occupation frequency change of each of the plurality of cells frame by frame, applying the point occupation frequency change calculated in the present frame to the point occupation frequency accumulated up to the previous frame, and update the point occupation frequency.

According to the embodiment of the present disclosure, the cell occupation frequency calculation unit 240 may calculate the point occupation frequency change of the plurality of cells included in the voxel, based on table 1 below.

TABLE 1

| Status of Cell | | Point Occupation Frequency Change | |
|---|---|---|---|
| | | Normal cell | Supporting cell |
| Unblocked Cell (Including Occupation Cell) | Occupation Cell | +1 | +5 |
| | Non-occupation Cell | −3 | −3 |
| Blocked Cell | Occupation Cell | Not Calculated | |
| | Non-occupation Cell | | |

Referring to table 1, the cell occupation frequency calculation unit 240 may add "1" to the point occupation frequency of a target cell targeted for the point occupation frequency calculation if the status of the target cell is an unblocked occupation cell and the attribute of the target cell is a normal cell, and may subtract "3" from the point occupation frequency of the target cell if the status of the target cell is an unblocked non-occupation cell and the attribute of the target cell is a supporting cell.

Meanwhile, referring to table 1, it can be confirmed that the degree of the point occupation frequency change of the supporting cell is greater than the degree of the point occupation frequency change of the normal cell. This may have the purpose that the supporting cell can be rapidly determined as the background cell by rapidly increasing the point occupation frequency of the supporting cell, since the supporting cell has a high possibility to be determined as the background cell.

Further, referring to table 1, it can be confirmed that the point occupation frequency change is not calculated for the blocked cell regardless of the attribute of the cell.

The point occupation frequency change described in table 1 is merely an example, and may be changed according to embodiments. That is, for example, the point occupation frequency change may be changed within a range in which a degree of the point occupation frequency change for the supporting cell is larger than that of the normal cell and the point occupation frequency change is not calculated for the blocked cell.

The cell type determination unit 250 may determine a type of each of the plurality of cells based on the accumulated point occupation frequency for each of the plurality of cells.

More specifically, the cell type determination unit 250 may determine whether each of the plurality of cells is a background cell or a foreground cell based on the accumulated point occupation frequency of each of the plurality of cells.

Here, the background cell may be a cell corresponding to a background such as a wall, a tree, etc. Since the background may not change or may change little over time, the distribution or the number of points occupying the background cell may be constant or may change little.

Further, the foreground cell may be a cell corresponding to an object such as a person and the like. Since the object may move over time, the distribution or the number of points occupying the foreground cell may change largely compared to the background cell.

For example, the cell type determination unit 250 may determine a cell having an accumulated point occupation frequency equal to or greater than (or greater than) a predetermined threshold as the background cell, and determine a cell having an accumulated point occupation frequency less than (or equal to or less than) the predetermined threshold as the foreground cell.

Figure 6:
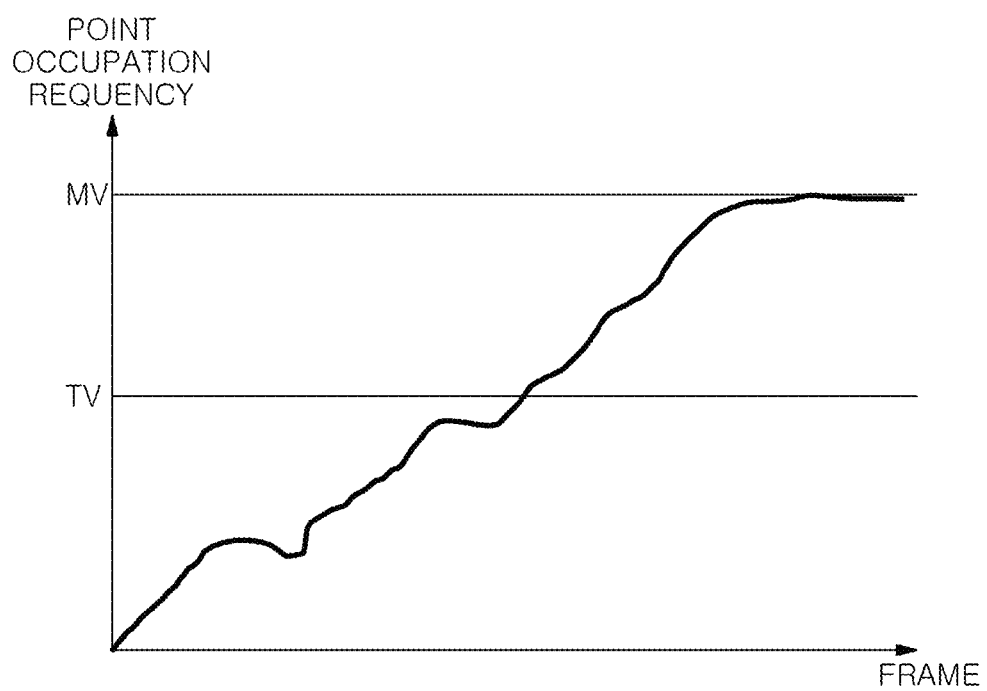
FIG. 6 is an example of a graph that shows point occupation frequencies according to frames used in a cell type determination unit for determining a type of a cell according to the embodiment of the present disclosure.

For example, FIG. 6 is an example of a graph that shows point occupation frequencies according to frames used in the cell type determination unit 250 for determining a type of a cell according to the embodiment of the present disclosure.

Referring to FIG. 6, the cell occupation frequency calculation unit 240 may calculate the point occupation frequency change of the target cell targeted for the point occupation frequency calculation frame by frame, and the point occupation frequency of the target cell may be updated frame by frame by applying the point occupation frequency change calculated in the present frame to the point occupation frequency of the target cell accumulated up to the previous frame.

The cell type determination unit 250 may determine that the target cell is the background cell if the point occupation frequency is equal to or greater than a predetermined threshold TV.

Meanwhile, for example, it may be possible to set a maximum value of the point occupation frequency that can be accumulated. That is, if a value for the point occupation frequency of the target cell that is updated frame by frame reaches the predetermined maximum value MV, a value for the point occupation frequency of the target cell may not be updated any more.

The dynamic map generation unit 260 may generate the dynamic map using cells determined as the background cells among the plurality of cells.

Figure 7:
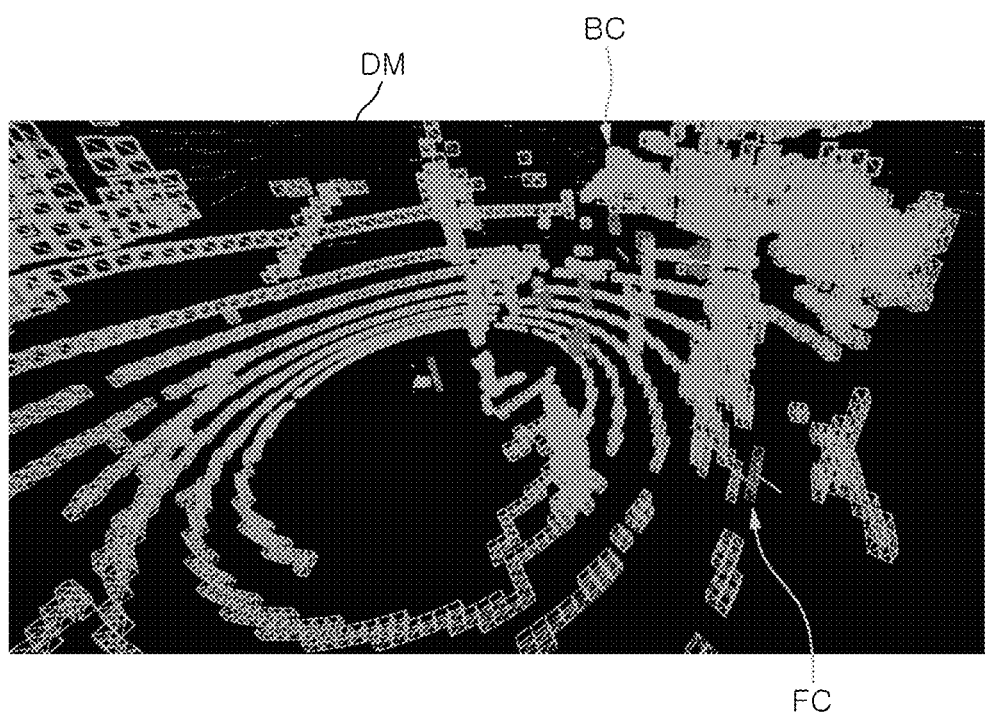
FIG. 7 is an example illustrating a result of generating the dynamic map by a dynamic map generation unit by using background cells according to the embodiment of the present disclosure.

For example, FIG. 7 is an example illustrating a result of generating the dynamic map by the dynamic map generation unit 260 by using background cells according to the embodiment of the present disclosure.

Referring to FIG. 7, the dynamic map generation unit 260 may generate the dynamic map DM using the background cells BC (illustrated as white color) updated to the present frame, and may display the foreground cells FC determined in the present frame on the dynamic map DM.

Further, the clustering performing unit 270 may display the foreground cells determined in the present frame on the dynamic map generated by the dynamic map generation program 200.

Here, the clustering performing unit 270 may cluster the foreground cells using positions of the foreground cells. For example, the clustering performing unit 270 may connect adjacent foreground cells among the foreground cells, and cluster the foreground cells such that the connected foreground cells are included in one cluster.

The clustering performing unit 270 may generate at least one cluster by clustering the foreground cells.

Figure 8:
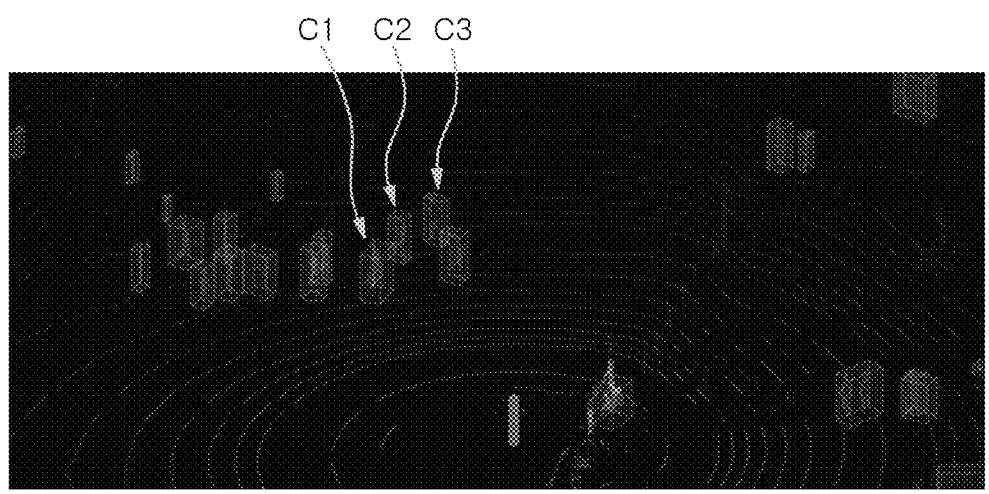
FIG. 8 is an example of a result of clustering foreground cells by a clustering performing unit according to the embodiment of the present disclosure.

For example, FIG. 8 is an example of a result of clustering foreground cells by a clustering performing unit 270 according to the embodiment of the present disclosure.

Referring to FIG. 8, the clustering performing unit 270 may connect adjacent foreground cells among the foreground cells, and cluster the foreground cells such that the connected foreground cells are included in one cluster.

As a result, the clustering performing unit 270 may generate a plurality of clusters (C1, C2, C3, . . . ) by clustering the foreground cells.

The object determination unit 280 may extract, from each of at least one cluster generated by the clustering performing unit 270, information about the object corresponding to each of the at least one cluster.

The object determination unit 280 may generate at least one foreground object that is moving in the present frame or that has moved in previous frames, using information about the object corresponding to each of the at least one cluster.

Then, the object determination unit 280 may determine whether each of the at least one foreground object is the detecting target object of the dynamic map generation apparatus 100 (i.e., the target object to be detected by the dynamic map generation apparatus 100).

More specifically, the object determination unit 280 may determine whether each of the at least one foreground object is the detecting target object (e.g., a person) by using a pre-trained object determination neural network.

That is, the object determination unit 280 may input the at least one foreground object into the object determination neural network, and determine whether each of the at least one foreground object is the detecting target object by using the result of classifying each of the at least one foreground object output from the object determination neural network.

In this connection, the object determination neural network may be trained in advance to output a classification result of foreground objects for training when the object determination neural network receives, as input data, the foreground objects for training (feature values of each of the foreground objects for training) and labeled objects that are the label data of the foreground objects for training.

Figure 9:
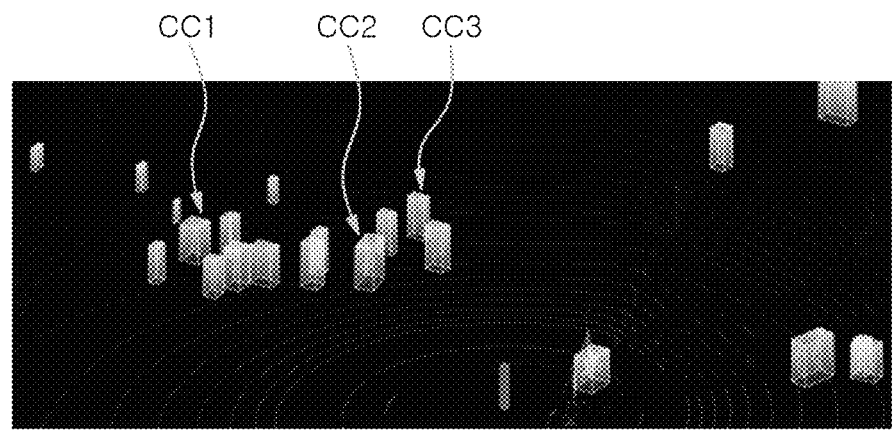
FIG. 9 is an example of a result of classifying each of at least one foreground objects by an object determination unit according to the embodiment of the present disclosure.
Figure 9:
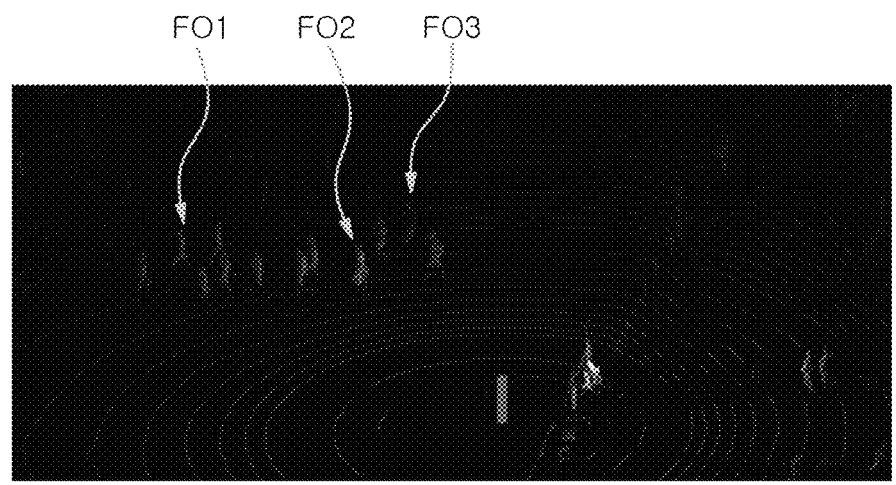

For example, FIG. 9 is an example of a result of classifying each of the at least one foreground object by using the object determination unit 280 according to the embodiment of the present disclosure.

Referring to FIG. 9, the object determination unit 280 may extract information about the objects indicated by a plurality of clusters (CC1, CC2, CC3, . . . ) from the plurality of clusters (CC1, CC2, CC3, . . . ) generated by the clustering performing unit 270, and generate a plurality of foreground objects (FO1, FO2, FO3, . . . ) using the information about the objects indicated by the extracted clusters (CC1, CC2, CC3, . . . ).

The object determination unit 280 may determine that each of the plurality of foreground objects (FO1, FO2, FO3, . . . ) indicate the person which is the detecting target object of the dynamic map generation apparatus 100, by inputting the plurality of foreground objects (FO1, FO2, FO3, . . . ) into the pre-trained object determination neural network.

Further, if there is the target object among the at least one foreground object, the object determination unit 280 may exclude foreground cells corresponding to the target object when the dynamic map is generating in the dynamic map generation program 200.

This prevents the foreground cells corresponding to the target object from being changed to background cells due to the increase of the point occupation frequency of the foreground cells corresponding to the target object.

In the present disclosure, a case where the object determination unit 280 excludes the foreground cells corresponding to the target object in generating the dynamic map is mainly described. However, the present disclosure is not limited thereto. For example, the cell occupation frequency calculation unit 240 included in the dynamic map generation program 200 may exclude the foreground cells corresponding to the target object in generating the dynamic map.

Figure 10:
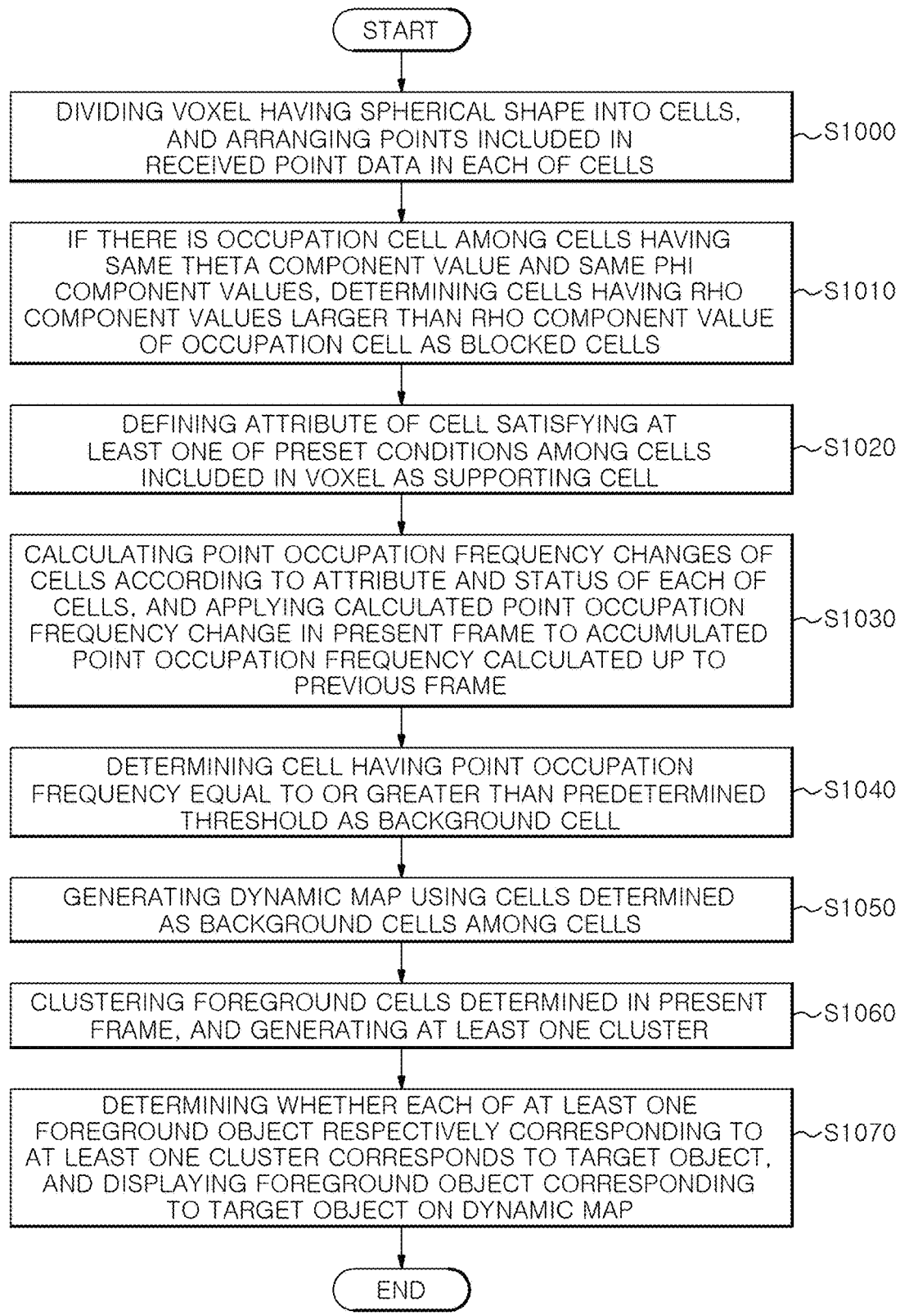
FIG. 10 is a flowchart illustrating a method for generating the dynamic map according to the embodiment of the present disclosure.

FIG. 10 is a flowchart illustrating a method for generating the dynamic map according to the embodiment of the present disclosure.

Referring to FIG. 1, FIG. 2 and FIG. 10, the voxel generation unit 210 may divide the generated spherically shaped voxel into a plurality of cells, and arrange the plurality of points included in the received point data in each of the plurality of cells (S1000).

The cell blocking determination unit 220 may determine cells having rho component values greater than a rho component value of the occupation cell as the blocked cells if there exists the occupation cell among cells having the same theta component value and the same phi component value (S1010).

The cell attribute determination unit 230 may define the attribute of a cell satisfying at least one of preset conditions as a supporting cell among the plurality of cells included in the voxel (S1020).

Then, the cell occupation frequency calculation unit 240 may calculate the point occupation frequency change of each of the plurality of cells, and apply the point occupation frequency change calculated in the present frame to the point occupation frequency accumulated up to the previous frame, in accordance with the attributes and the status of the cells (S1030).

The cell type determination unit 250 may determine a cell having the point occupation frequency equal to or greater than a predetermined threshold as the background cell (S1040), and the dynamic map generation unit 260 may generate the dynamic map using the cells determined as the background cells among the plurality of cells (S1050).

Further, the clustering performing unit 270 may cluster the foreground cells determined in the present frame, and generate at least one cluster (S1060).

The object determination unit 280 may determine whether each of at least one foreground object respectively corresponding to the at least one cluster corresponds to the target object using pre-trained object determination neural network, and display the foreground object corresponding to the target object on the dynamic map (S1070).

According to the embodiment of the present disclosure, the dynamic map is generated by dividing the voxel into the plurality of cells, it is possible to efficiently and rapidly process the plurality of points acquired using the lidar sensor.

Further, according to the embodiment of the present disclosure, the dynamic map is generated by dividing the voxel into the plurality of cells, it is possible to generate and update the dynamic map in real time.

The combinations of respective blocks of block diagrams and respective sequences of a flow diagram attached herein is carried out by computer program instructions which are executed through various computer means and recorded in a non-transitory computer-readable recording medium. Since the computer program instructions is loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, is stored in a memory unit, which comprises non-transitory computer-readable medium, useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provides operations for executing functions described in the respective blocks of the block diagrams and the respective sequences of the flow diagram. The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. A method for generating a dynamic map, which is performed by a dynamic map generation apparatus, the method comprising:
    arranging point data acquired from a lidar sensor in a plurality of cells included in a voxel;
    calculating a point occupation frequency change of each of the plurality of cells according to an attribute and a status of each of the plurality of cells; and
    generating the dynamic map by using, among the plurality of cells, background cells in each of which a value accumulating the point occupation frequency change is equal to or greater than a predetermined threshold.

2. The method of claim 1, wherein the attribute of each of the plurality of cells includes a normal cell and a supporting cell of which a possibility of being the background cells is higher than the normal cell, and
    wherein the calculating of the point occupation frequency change of each of the plurality of cells comprises:
    determining, among the plurality of cells, an attribute of a cell satisfying at least one of preset conditions as the supporting cell.

3. The method of claim 2, wherein the preset conditions comprise whether all of cells adjacent to each of the plurality of cells are determined as the background cells, and whether each of the plurality of cells is an occupation cell and other cells having a same rho component value and a same theta component value as each of the plurality of cells are non-occupation cells.

4. The method of claim 2, wherein the supporting cell has a degree of the point occupation frequency change that is greater than that of the normal cell.

5. The method of claim 1, wherein the background cells have an accumulated value which is obtained by applying the point occupation frequency change calculated in a present frame to a point occupation frequency accumulated up to a previous frame.

6. The method of claim 1, wherein the status of each of the plurality of cells includes a blocked cell that does not have the point occupation frequency change and an unblocked cell that has the point occupation frequency change, and
    wherein the calculating of the point occupation frequency change of each of the plurality of cells comprises:
    when there exists an occupation cell, determining a cell having a same theta component value and a same phi component value with the occupation cell and having a rho component value greater than a rho component value of the occupation cell as the blocked cell, among the plurality of cells.

7. The method of claim 6, wherein the point occupation frequency change is obtained by calculating only the point occupation frequency change of cells other than the blocked cell among the plurality of cells, without calculating the point occupation frequency change of the blocked cell.

8. The method of claim 1, further comprising:
    clustering foreground cells corresponding to a moving object among the plurality of cells into one or more clusters;
    determining, by using a pre-trained object determination neural network, whether each of one or more foreground objects, respectively corresponding to the one or more clusters, corresponds to a detecting target object of the dynamic map generation apparatus; and
    displaying the foreground objects corresponding to the detecting target object among the one or more foreground objects on the dynamic map.

9. The method of claim 8, wherein the pre-trained object determination neural network is trained in advance to output a classification result of a foreground object for training when the pre-trained object determination neural network receives feature values of the foreground object for training and a labeled object that is label data of the feature values of the foreground object for training.

10. A dynamic map generation system comprising:
    a lidar sensor configured to acquire point data by detecting a vicinity of the lidar sensor; and
    a dynamic map generation apparatus configured to generate a dynamic map,
    wherein the dynamic map generation apparatus comprises:
    a transceiver configured to acquire the point data from the lidar sensor; and
    a processor configured to control the transceiver,
    wherein the processor is configured to:
    arrange the point data in a plurality of cells included in a voxel;
    calculate a point occupation frequency change of each of the plurality of cells according to an attribute and a status of each of the plurality of cells; and
    generate the dynamic map by using, among the plurality of cells, background cells in each of which a value accumulating the point occupation frequency change is equal to or greater than a predetermined threshold.

11. The dynamic map generation system of claim 10, wherein the background cells have an accumulated value which is obtained by applying the point occupation frequency change calculated in a present frame to a point occupation frequency accumulated up to a previous frame.

12. The dynamic map generation system of claim 10, wherein the status of each of the plurality of cells includes a blocked cell that does not have the point occupation frequency change and an unblocked cell that has the point occupation frequency change, and
wherein the processor is configured to further:
when there exists an occupation cell, determine a cell having a same theta component value and a same phi component value with the occupation cell and having a rho component value greater than a rho component value of the occupation cell as the blocked cell, among the plurality of cells,
wherein the point occupation frequency change is obtained by calculating only the point occupation frequency change of cells other than the blocked cell among the plurality of cells, without calculating the point occupation frequency change of the blocked cell.

13. A non-transitory computer-readable storage medium storing computer-executable instructions which, when executed by a processor and performed by a dynamic map generation apparatus, cause the processor to perform a method for dynamic map generation comprising:
arranging point data acquired from a lidar sensor in a plurality of cells included in a voxel;
calculating a point occupation frequency change of each of the plurality of cells according to an attribute and a status of each of the plurality of cells; and
generating a dynamic map by using, among the plurality of cells, background cells in each of which a value accumulating the point occupation frequency change is equal to or greater than a predetermined threshold.

14. The non-transitory computer-readable storage medium of claim 13, wherein the attribute of each of the plurality of cells includes a normal cell and a supporting cell of which a possibility of being the background cells is higher than the normal cell, and
wherein the calculating of the point occupation frequency change of each of the plurality of cells comprises:
determining, among the plurality of cells, an attribute of a cell satisfying at least one of preset conditions as the supporting cell.

15. The non-transitory computer-readable storage medium of claim 14, wherein the preset conditions comprise whether all of cells adjacent to each of the plurality of cells are determined as the background cells, and whether each of the plurality of cells is an occupation cell and other cells having a same rho component value and a same theta component value as each of the plurality of cells are non-occupation cells.

16. The non-transitory computer-readable storage medium of claim 14, wherein the supporting cell has a degree of the point occupation frequency change that is greater than that of the normal cell.

17. The non-transitory computer-readable storage medium of claim 13, wherein the status of each of the plurality of cells includes a blocked cell that does not have the point occupation frequency change and an unblocked cell that has the point occupation frequency change, and
wherein the calculating of the point occupation frequency change of each of the plurality of cells comprises:
when there exists an occupation cell, determining a cell having a same theta component value and a same phi component value with the occupation cell and having a rho component value greater than a rho component value of the occupation cell as the blocked cell, among the plurality of cells.

18. The non-transitory computer-readable storage medium of claim 17, wherein the point occupation frequency change is obtained by calculating only the point occupation frequency change of cells other than the blocked cell among the plurality of cells, without calculating the point occupation frequency change of the blocked cell.

19. The non-transitory computer-readable storage medium of claim 13, further comprising:
clustering foreground cells corresponding to a moving object among the plurality of cells into one or more clusters;
determining, by using a pre-trained object determination neural network, whether each of one or more foreground objects, respectively corresponding to the one or more clusters, corresponds to a detecting target object of the dynamic map generation apparatus; and
displaying the foreground objects corresponding to the detecting target object among the one or more foreground objects on the dynamic map.

20. The non-transitory computer-readable storage medium of claim 19, wherein the pre-trained object determination neural network is trained in advance to output a classification result of a foreground object for training when the pre-trained object determination neural network receives feature values of the foreground object for training and a labeled object that is label data of the feature values of the foreground object for training.

* * * * *